Dec. 1, 1959  A. JACOBOWSKY ET AL  2,915,565
PROCESS OF PREPARING VINYLIDENE HALIDE
Filed Sept. 21, 1954
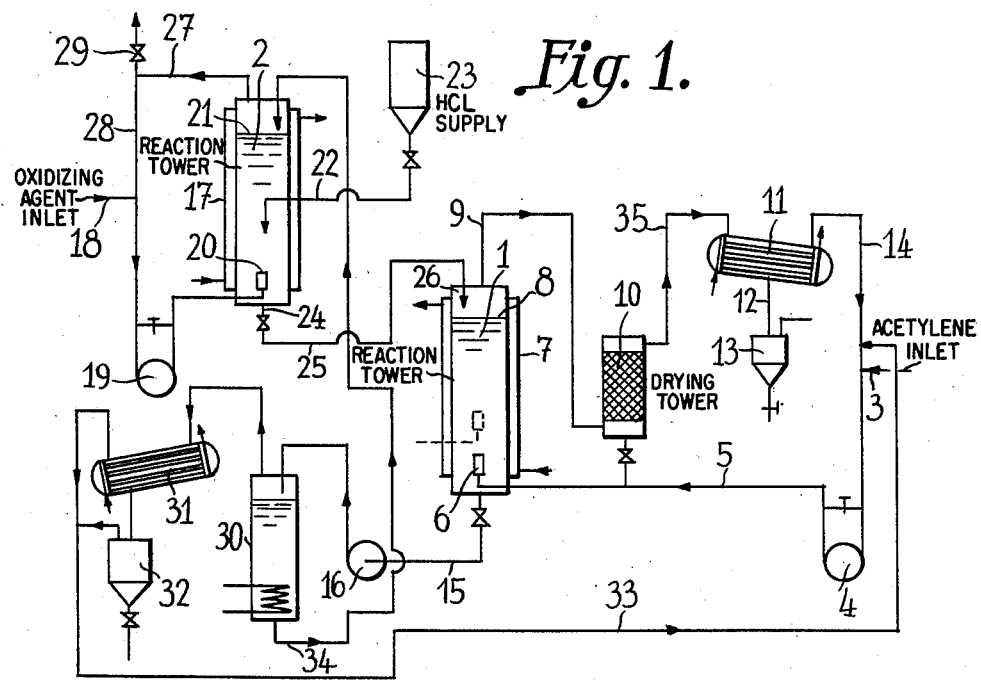
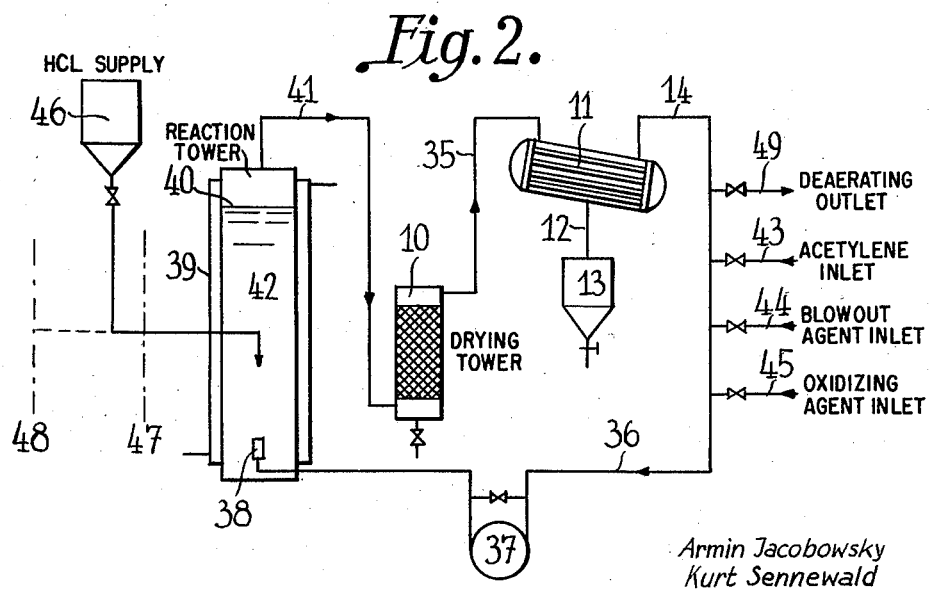
Armin Jacobowsky
Kurt Sennewald
INVENTORS
BY *Connolly and Hutz*
their ATTORNEYS

United States Patent Office 2,915,565
Patented Dec. 1, 1959

2,915,565

PROCESS OF PREPARING VINYLIDENE HALIDE

Armin Jacobowsky and Kurt Sennewald, Knapsack, near Koln, Germany, assignors to Knapsack-Griesheim Aktiengesellschaft, Knapsack, near Koln, Germany Application September 21, 1954, Serial No. 457,512

Claims priority, application Germany September 25, 1953

10 Claims. (Cl. 260—654)

It is known to prepare 1,1-dichlorethylene (vinylidene chloride) from acetylene or ethylene. In most cases this process is carried out in several stages: acetylene is, for instance, used as starting material, vinyl chloride is obtained therefrom and, by way of trichlorethane, vinylidene chloride is obtained.

It is also known to prepare dihalogen ethylene from acetylene and hydrogen halide by conducting gaseous acetylene at higher temperatures over aluminium oxide, which is impregnated with metal halides such as copper chloride, and by regenerating this catalyst in a second stage.

In addition, it is known that by introducing acetylene into a hydrohalic acid solution of a cuprous halide and an ammonium halide a mixture of vinyl chloride and unsaturated hydrocarbons is obtained.

U.S. specification Serial No. 359,366 filed June 3, 1953, now abandoned, describes a method of preparing trans-1,2-dichlorethylene in a high state of purity by introducing acetylene into a hydrochloric contact solution of cupric chloride which also contains cuprous chloride.

Now, we have found that the process described in the above quoted specification can be modified in such a way and larger quantities of the valuable 1,1-dichlorethylene (vinylidene chloride) can be obtained in one stage from acetylene in addition to 1,2-dichlorethylene, if an alkali chloride and/or alkaline earth metal chloride is added to the contact solution described in the above quoted specification and containing hydrochloric acid, cupric chloride as well as cuprous chloride. The concentration of hydrogen chloride in the contact solution must also be simultaneously reduced to 2–10% (0.58–2.9 mols per liter), preferably to 3.8–4.5% (1.1–1.3 mols per liter). The acetylene is activated by the simultaneous presence of cuprous chloride and alkali chloride or alkaline earth metal chloride so that by the action of cupric chloride, the one hydrogen atom of the acetylene is replaced by chlorine and the asymmetrical 1,1-dichlorethylene is formed in addition to trans-1,2-dichlorethylene while the cupric chloride is reduced to cuprous chloride.

A mixture of trans-1,2-dibromethylene and 1,1-dibromoethylene can be produced according to the same process and also in one stage when using hydrobromic acid and the corresponding bromides instead of the chlorides. According to the process of the present invention, the dihalogen ethylenes can thus be prepared from halogens having an atomic weight of at least 35 and not more than 80.

It is surprising that by the said measures up to about 40% of the valuable 1,1-dichlorethylene is obtained in addition to trans-1,2-dichlorethylene.

The 1,1- and 1,2-dihalogenethylenes can, for instance, be separated by fractional distillation. In this way, pure 1,1-dichlorethylene can be isolated which boils at 37° C.

The contact composition may be varied within wide limits. The concentration of hydrochloric acid in the contact solution which should amount to 2–10% (0.58– 2.9 mols per liter), preferably to 3.8–4.5% (1.1–1.3 mols per liter), is essential for its action. If the concentration of hydrochloric acid exceeds this optimum, the percentage of 1,1-dichlorethylene decreases in favor of the content of trans-1,2-dichlorethylene, while, when lower concentrations of hydrochloric acid are present there is a tendency towards the separation of a black precipitate which contains bivalent copper and is insoluble in dilute hydrochloric acid.

As halides, all alkali chlorides, alkaline earth metal chlorides and bromides including the ammonium compounds which may be substituted by alkyl, as for instance, trimethylamine hydrochloride and aniline hydrochloride, are suitable. Of the said compounds the use of the potassium and ammonium compounds is especially suitable. However, the solution may also contain other anions than chlorine and bromine ions, for instance, sulfate ions.

When carrying out the new process, a reaction temperature of 60–120° C. preferably of 85–110° C. should be observed. The same temperature is also applied when regenerating the reduced contact solution. During the regeneration the cuprous halide produced by the reaction is again oxidized to cupric halide. It is of special advantage if in both cases the operation is carried out at a temperature of 95° C.

The yield obtained in one passage depends on the height of the contact column. In the case of the preparation of dichlorethylene, the yield amounts to 30% of the acetylene used.

It is of advantage but not necessary to work under pressure. The upper limit of the pressure range is given by the highest pressure normally admissible for safely handling acetylene (1.5 atmospheres gauge pressure =2.5 atmospheres absolute pressure) and the pressure depends on the height of the contact column. The lower limit of the pressure range up to which the process of the present invention can be carried out amounts to about 100 mm. of mercury.

The reduced contact solution can be reoxidized to the required content of cupric chloride and thus be regenerated by addition of aqueous hydrochloric acid of any concentration or by gaseous hydrogen chloride which may contain chlorine as an impurity, by oxygen or air or also by free halogen.

The water introduced with the aqueuos hydrochloric acid is removed therefrom by heating to 105° C. after treatment of the contact solution with acetylene. The unchanged acetylene dissolved in the contact solution escapes at the same time so that the contact solution may subsequently be reoxidized without danger by means of oxygen or air.

The total concentration of copper is advantageously kept between 2.0 and 4.0 mols per liter. A lower concentration causes a decrease of the efficiency of the contact solution while higher concentrations bring about increasing formation of by-products, for instance, when preparing dichlorethylene, vinyl chloride is formed at the expense of 1,1-dichlorethylene, and the contact solution tends to crystallize in the pipe lines.

For the formation of 1,1-dihalogen ethylene, a molar ratio of $Cu^+:Cu^{++}$ varying from 4:1 to 9:1 and a molar ratio of the total concentration of copper to the concentration of alkali halide of 1:1 has proved to be of special advantage. A higher concentration of alkali halide causes a decrease of the activity of the contact while, in the case of a lower concentration, cuprous halide separates from the solution. However, the ratio of the total copper concentration to the concentration of the alkali and/or alkaline earth metal ions may vary within the limits 1:0.8 and 1:1.5.

The following methods of operation are described by way of example and are illustrated in the accompanying diagrammatic drawings:

When working continuously, the operation is advantageously carried out in two reaction vessels, for instance, in the reaction towers 1 and 2 (see Fig. 1), the contact solution being conducted in a cycle. When, for instance, preparing dichlorethylene which is described in the following, the chlorination of the acetylene into dichlorethylene with the simultaneous reduction of cupric chloride into cuprous chloride is carried out in the first vessel, while in the second vessel the regeneration of the contact solution with the partial oxidation of the cuprous chloride into the cupric chloride takes place. As reaction vessels there may be used towers, or vessels provided with stirrers, injectors, turbomixers etc.

The acetylene enters the apparatus at 3 and is introduced through the tube 5 into the tower 1 by means of the pump 4 and a nozzle 6. The tower 1 can be heated by means of the jacket 7. The tower 1 is filled up to level 8 with the contact solution described above.

The reaction product is passed through tube 9 into the drying tower 10 which is, for instance, filled with calcium chloride; the product is then passed through the tube 35 into a cooler 11 and flows after condensation through a tube 12 into the separating vessel 13. The portion which was not condensed in the cooler 11 and which consists of unchanged acetylene is re-introduced through the pipe 14 into the reaction cycle beginning at 3.

The contact solution used up during the reaction in the tower 1, in which the cupric halide is reduced to cuprous halide, is passed through the tube 15 by means of a pump 16 into a column 30, where the acetylene dissolved in the contact solution and simultaneously the water introduced with the hydrochloric acid are distilled off. The water is condensed in the cooler 31 and is separated in the vessel 32; the dissolved acetylene flows through the tube 33 back into the gas cycle. The contact solution which is boiled in column 30 is passed through tube 34 into the reaction tower 2. Tower 2 may also be heated by means of a jacket 17. The cuprous halide being present in the introduced contact solution is partially oxidized in the tower 2 to cupric halide by means of air, oxygen or chlorine. The air, oxygen or chlorine is introduced at 18 and, by means of a pump 19 and a nozzle 20, passed into the tower 2 which is filled up to 21 with the contact solution to be regenerated. The quantity of hydrogen chloride required for the regeneration of the contact solution is passed, in the gaseous state or in the form of an aqueous solution, from the supply vessel 23 through the tube 22 into the tower 2. At 24, the regenerated contact solution leaves tower 2 and enters tube 25 and at 26 it enters tower 1. Tower 2 can be de-aerated by way of tube 27 and cock 29. The oxygen which was not used up can be re-introduced into the tower 2 by way of the pipes 27, 28 and the pump 19.

By means of the described apparatus it is possible to react the acetylene in a continuous manner in the tower 1; in this case, the contact solution used up is led away in the required manner through the tube 15 and, in the regenerated form, the required quantity is continuously let in through the tube 25.

The operation can also be carried out discontinuously in one reaction vessel in such a manner that in the same vessel first the dichlorethylene is formed and, after the latter has been blown out by means of nitrogen, the contact solution is regenerated. This method of working is illustrated in Fig. 2.

At 43 the acetylene is introduced into the pipe 36 and, by means of the pump 37 and the nozzle 38, then passed into the reaction tower 42 which can be heated by the jacket 39.

The reaction tower 42 contains a contact solution of the composition described above. The contact solution fills the tower 42 up to 40. The reaction products 1,2-dichlorethylene and 1,1-dichlorethylene pass through the tube 41 into a drying tower 10 which may, for instance, be filled with calcium chloride. Thereupon they pass through the tube 35 into the cooler 11, from where the condensed mixture of 1,2-dichlorethylene and 1,1-dichlorethylene flows through the tube 12 into the supply vessel 13. The non-converted acetylene which is admixed with some 1,2-dichlorethylene and 1,1-dichlorethylene is not condensed in the condenser 11 and passes again through the tubes 14 and 36 into the reaction tower 42.

When the contact solution is exhausted the supply of acetylene is stopped. Through 44 the apparatus is blown through with nitrogen and subsequently oxygen or another gas capable of oxidizing is introduced at 45; said gas passes through 36, 37 and 38 as described above into the reaction tower 42 where it regenerates the contact solution; the hydrogen chloride required for the regeneration of the contact solution is conducted at the same time, in the gaseous or aqueous form, from the supply vessel 46 into the reaction tower 42.

After regeneration of the contact solution and after the apparatus has been blown through at 44 with nitrogen, the process is restarted with the reaction described above while introducing acetylene.

The apparatus situated on the right-hand side of the plane given at 47 is once more present as a mirror image on the left-hand side of the plane given 48; the process can, therefore, also be effected so that in the devices mounted on the right-hand side of 47 and on the left-hand side of 48 the afore-described reaction and the regeneration of the contact solution take place alternately.

The apparatus can be de-aerated at 49.

The process according to the invention shows a number of advantages as compared with the known processes. These advantages reside in the following:

When, for instance, preparing the dichlorethylenes according to the known processes, the 1,1-dichlorethylene is manufactured from acetylene in 3 stages through the intermediate products vinyl chloride and trichlorethylene while the process according to the present invention furnishes the 1,1-dichlorethylene in one stage direct from acetylene.

The known processes use either dry and gaseous hydrogen chloride or elementary chlorine while, according to the process of the present invention, aqueous hydrochloric acid of any concentration or hydrogen chloride which may also contain chlorine as an impurity may be added to the reaction solution, provided the latter retains a concentration within the above quoted limits.

In some of the known processes, bases such as milk of lime, potassium hydroxide solution, or ammonia, split off a molecule of hydrogen chloride from the intermediate product trichlorethane. The chlorine of the split off molecule is then lost. In the process according to the present invention, on the other hand, the hydrohalic acid or the hydrogen halide is used up quantitatively for the formation of dichlorethylene.

Compared with the chlorination in the gaseous phase, the advantage of the process according to the present invention resides in the fact that it is possible to work in a continuous manner, that the operation can be carried out at lower temperatures, that a uniformly chlorinated product is obtained and the portion of the by-products is reduced, that, since the operation is carried out at lower temperatures and in the liquid phase, the danger of explosion and the risk of decomposition of the acetylene is considerably diminished. A further advantage resides in the fact that in the process according to the present invention the hydrogen halide can be added in an aqueous solution or in the form of hydrogen halide which may contain free halogen as an impurity. Finally, the reaction heat can be eliminated much more easily when working in a liquid phase than when operating in the gaseous phase.

The following examples serve to illustrate the invention but they are not intended to limit it thereto:

*Example 1*

Through a reaction tower with heating jacket which contains 1 liter of an aqueous contact solution of the following composition:

Cuprous chloride, 1.9 mols per liter=188 grams per liter
Cupric chloride, 0.3 mols per liter=40 grams per liter
Ammonium chloride, 2.2 mols per liter=118 grams per liter
Hydrogen chloride, 1.2 mols per liter=44 grams per liter are passed in a cycle, at 85° C., 200 liters per hour of acetylene, of which 18.8 liters (9.4%) per hour are converted into dichlorethylene. The dichlorethylene is removed from the gas cycle by condensing it at —20° C. It consists of 32 grams of 1,1-dichlorethylene (vinylidene chloride) (40%) and 48 grams of 1,2-dichlorethylene (60%).

The yield of dichlorethylene amounts to 98% calculated upon the converted acetylene. The capacity of the catalyst is 80 grams of dichlorethylene per liter of catalyst per hour.

The contact solution is conveyed continuously from the reaction tower 1 into the column 30 where the acetylene dissolved in the contact solution is removed by boiling. The solution which is now free from acetylene is pumped into a second tower 2, where it is reoxidized with oxygen while adding hydrochloric acid of 12 percent strength. It is then continuously re-introduced into the reaction tower 1 so that the contact solution has always the same composition quoted above.

*Example 2*

Through 2 liters of an aqueous contact solution of the following composition:

Cuprous chloride, 3.6 mols per liter=356 grams per liter
Cupric chloride, 0.4 mols per liter=54 grams per liter
Potassium chloride, 4.0 mols per liter=298 grams per liter
Hydrogen chloride, 1.3 mols per liter=48 grams per liter are passed in a cycle and in the same manner as described in Example 1, at 95° C., 300 liters per hour of acetylene, of which 47 liters (15.7%) per hour are converted into dichlorethylene. The latter is removed from the gas cycle by condensing it at —18° C. It consists of 76.5 grams of 1,1-dichlorethylene (vinylidene chloride) (39%) and 119.5 grams of 1,2-dichlorethylene (61%).

The yield of dichlorethylene amounts to 96% calculated upon the converted acetylene. The capacity of the catalyst is 98% of dichlorethylene per liter of catalyst per hour.

The acetylene dissolved in the contact solution is removed by heating to 105° C. The solution is then passed into a second reaction tower, where it is reoxidized with oxygen while adding wet hydrogen chloride which contains 4% of chlorine. The solution is continuously pumped through the two reaction towers with a speed of 2 liters per hour, the supply of oxygen to the second reaction tower being regulated in such a way that the afore-mentioned concentration of bi-valent copper in the contact solution is maintained.

*Example 3*

Through a reaction tower with heating jacket which contains 1 liter of an aqueous contact solution of the following composition:

Cuprous chloride, 4.5 mols per liter=445 grams per liter
Cupric chloride, 0.5 mols per liter=67 grams per liter
Ammonium chloride, 5.0 mols per liter=267 grams per liter
Hydrogen chloride, 1.3 mols per liter=48 grams per liter are passed in a cycle and in the same manner as described in Example 1, at 90° C., 100 liters per hour of acetylene, of which 30 liters (30%) per hour are converted. The reaction product is removed by condensation from the gas cycle by cooling to —20° C. It consists of 2.5 grams of vinyl chloride (2%), 47.0 grams of 1,1-dichlorethylene (vinylidene chloride) (38%), and 74.5 grams of 1,2-dichlorethylene (60%).

The yield of dichlorethylene amounts to 96% calculated upon the converted acetylene. The capacity of the catalyst is 124 grams of the crude product per liter of catalyst per hour.

The contact solution is free from dissolved acetylene in a short, well insulated column 30 and reoxidized in a second tower by means of air while adding hydrochloric acid of 36 percent strength. The solution is then pumped continuously through the two towers so that the aforementioned composition of the contact solution is maintained.

*Example 4*

Through 1 liter of an aqueous contact solution of the following composition:

Cuprous bromide, 1.8 mols per liter=258 grams per liter
Cupric bromide, 0.4 mols per liter=89 grams per liter
Ammonium bromide, 2.2 mols per liter=216 grams per liter
Hydrobromic acid, 1.2 mols per liter=97 grams per liter are passed in a cycle as described in the preceding examples, at 100° C., 220 liters per hour of acetylene, of which 24 liters (11%) per hour are converted into dibromethylene. The dibromethylene is removed from the gas cycle by condensation at —20° C. It consists of 67 grams of 1,1-dibromethylene (36%) boiling at 92° C. and 118 grams of trans-1,2-dibromethylene (64%) having a boiling point of 109° C.

The yield amounts to 93% calculated upon the converted acetylene. The capacity of the catalyst is 185 grams of dibromethylene per liter of catalyst per hour. After the dissolved acetylene has been removed, the contact solution is reoxidized continuously in a second tower to the aforementioned composition by addition of bromine.

*Example 5*

Through a reaction tower with heating jacket which contains 1 liter of an aqueous contact solution of the composition as quoted in Example 1 are passed in a cycle, at 110° C. and under a pressure of 1.5 atmospheres (gauge pressure), 250 liters per hour of acetylene, of which 22 liters per hour are converted. The dichlorethylene is removed from the gas cycle by condensation at —10° C. and under a pressure of 1.5 atmospheres (gauge pressure). It consists of 39 grams of 1,1-dichlorethylene (42%) and 53 grams of trans-1,2-dichlorethylene (58%).

The yield amounts to 97% calculated upon the converted acetylene. The capacity of the catalyst is 92 grams of the mixture of dichlorethylenes per liter of catalyst per hour. The regeneration of the contact solution is carried out as described in Example 1.

*Example 6*

Through a reaction tower with heating jacket which contains 1 liter of an aqueous contact solution of the composition given in Example 1, are passed, at 85° C., 200 liters per hour of acetylene. The dichlorethylene which is formed in a quantity of 80 grams per hour is removed from the non-converted acetylene by condensation at —30° C.

In the same tower the contact solution is freed from acetylene by blowing with nitrogen and is reoxidized to the original composition by means of air while adding hydrogen chloride.

We claim:

1. A process for directly converting acetylene to vinylidene halide which comprises reacting the acetylene at a temperature of about 60 to about 120° C. and a pressure of about 100 millimeters of mercury to about 2.5 atmospheres with an aqueous solution of cuprous halide, cupric halide, hydrogen halide and a supplemental halide selected from the group consisting of alkali metal halide, alkaline earth metal halide and ammonium halide, the halogen of said halides having an atomic weight of at least 35 but not more than 80, the hydrogen halide content of said solution being between about 0.58 and about 2.9 mols per liter, the molar ratio of cuprous to cupric halide being from about 4:1 to about 9:1 and the molar ratio of the total copper halides to the supplemental halide being between about 1:0.8 and about 1:1.5.

2. The process of claim 1 in which the halides are chlorides.

3. The process of claim 1 in which the halides are bromides.

4. The process of claim 1 in which the reaction temperature is between 85 and 110° C.

5. The process of claim 1 in which the total concentration of the copper halides is between 2 and 4 mols per liter.

6. The process of claim 1 in which the molar ratio of the total copper halides to the supplemental halide is about 1:1.

7. The process of claim 1 in which the supplemental halide is an ammonium halide.

8. The process of claim 1 in which the supplemental halide is a potassium halide.

9. The process of claim 1 in which the hydrogen halide content in the aqueous solution is between about 1.1 and about 1.3 mols per liter.

10. A process for directly converting acetylene to vinylidene chloride, said process comprising the steps of bubbling gaseous acetylene at a pressure of between about 100 millimeters of mercury and about 2½ atmospheres into an aqueous solution of cuprous chloride, cupric chloride, hydrogen chloride and a supplemental chloride selected from the group consisting of alkali metal chloride, alkaline earth metal chloride and ammonium chloride, the hydrogen chloride content of said solution being between about 0.58 and about 2.9 mols per liter, the molar ratio of cuprous to cupric chloride being from about 4:1 to 9:1 and the molar ratio of the total copper chlorides to the supplemental chloride being between about 1:0.8 to about 1:1.5, the solution being held at a temperature between about 60 and about 120° C., collecting a gaseous effluent containing vinylidene chloride mixed with trans-1,2-dichlorethylene and separating the vinylidene chloride from the effluent.

References Cited in the file of this patent

UNITED STATES PATENTS

| | | |
|---|---|---|
| 1,811,959 | Nieuwland | June 30, 1931 |
| 2,399,488 | Hearne | Apr. 30, 1946 |
| 2,440,997 | Adler | May 4, 1948 |
| 2,520,712 | Cheney | Aug. 29, 1950 |
| 2,809,221 | Thomas et al. | Oct. 8, 1957 |

OTHER REFERENCES

Nieuwland et al.: "Proc. Indiana Acad. Sci.," vol. 38, page 196 (1929).